United States Patent

Fukaya et al.

[11] Patent Number: 4,764,696
[45] Date of Patent: Aug. 16, 1988

[54] STEP MOTOR

[75] Inventors: Katsuyoshi Fukaya; Katsumi Mineyama, both of Obu, Japan

[73] Assignee: Aisan Kogyo Kabushiki Kaisha, Aichi, Japan

[21] Appl. No.: 907,911

[22] Filed: Sep. 16, 1986

[30] Foreign Application Priority Data

Sep. 30, 1985 [JP] Japan .................. 60-149783[U]

[51] Int. Cl.$^4$ ............................................. H02K 37/00
[52] U.S. Cl. ..................................... 310/49 R; 310/80; 310/83
[58] Field of Search ................... 310/49, 80, 83, 49 R, 310/49 A

[56] References Cited

U.S. PATENT DOCUMENTS

| | | | |
|---|---|---|---|
| 2,978,621 | 4/1961 | Martinek | 310/83 X |
| 3,159,758 | 12/1964 | Hemperley, Jr. et al. | 310/83 |
| 4,333,026 | 6/1982 | Bock et al. | 310/49 X |
| 4,381,747 | 5/1983 | Kobayashi et al. | 310/49 X |
| 4,393,319 | 7/1983 | Bock | 310/49 X |
| 4,438,361 | 3/1984 | Manson | 310/49 X |
| 4,480,614 | 11/1984 | Kobashi et al. | 310/49 X |
| 4,496,865 | 1/1985 | Allen et al. | 310/80 |
| 4,501,981 | 2/1985 | Hansen | 310/49 |
| 4,588,913 | 5/1986 | Adami | 310/49 X |

Primary Examiner—Patrick R. Salce
Assistant Examiner—Judson H. Jones
Attorney, Agent, or Firm—Armstrong, Nikaido, Marmelstein & Kubovcik

[57] ABSTRACT

A step motor of the linear type has a shaft threadedly engaged with an inner hole of a rotor and is slidably supported for axial movement by a front bearing and a rear bearing. A stopper pin that abuts on a stationary portion at the rear end of travel projects from an outer circumferential portion of the shaft. The shaft is moved in the axial direction by the rotation of the rotor and the front shaft bearing is provided with a slot allowing the stopper pin to pass through. Consequently, when the shaft is advanced, the stopper pin for stopping the rear end of travel does not abut on the front bearing, and the advance of the shaft is not limited. The slot, therefore, allows the stroke of the shaft to be lengthened without lengthening the front portion of the housing.

2 Claims, 1 Drawing Sheet

STEP MOTOR

BACKGROUND OF THE INVENTION

1. Field of the Invention

The present invention relates to a step motor of linear type, wherein a shaft is threadedly engaged with an inner hole provided on a rotor and is driven in the axial direction by rotation of the rotor.

2. Description of the Prior Art

In the prior art, a step motor of linear type, in which a shaft having a male screw is threadedly engaged with a female screw provided on an inner hole of a rotor and is driven in the axial direction by rotation of the rotor, has been used as a drive device of a flow rate control valve, for example.

As shown in FIG. 1, the step motor comprises a housing 31, a stator 32 fixed in the housing 31, a rotor 33 with a magnet member rotatably supported by an inner race of a ball bearing 34, a female screw provided on an inner hole of the rotor 33, and a shaft 35 having a male screw threadedly engaged with the inner hole of the rotor 33 and slidably supported in the axial direction by a front bearing 36 and a rear bearing 37. A stopper pin 37 is projected on outer circumferential portion of the shaft 35 on front side of the ball bearing 34, and abuts on the front end of the rotor 33 at the rear traveling end of the shaft 35 thereby the shaft 35 is stopped.

In this constitution, however, since the front bearing 36 exists on front side of the stopper pin 37 (to the left in FIG. 1) and the stopper pin 37 abuts on the front bearing 36 at the front traveling end of the shaft 35, the front bearing 36 must be installed forward in order to lengthen the stroke of the shaft 35, thereby the installation position of the front bearing 36 is limited or the front portion of the housing 31 is made long and large.

SUMMARY OF THE INVENTION

A step motor of the invention is constituted in that a shaft is threadedly engaged with an inner hole provided on a rotor and slidably supported by a front bearing and a rear bearing, a stopper pin abutting on a stationary portion at the rear traveling end is projected on outer circumferential portion of the shaft, the shaft is moved in the axial direction by the rotation of the rotor, and a slit allowing the stopper pin to pass is provided on the front bearing to support slidably the front portion of the shaft.

An object of the invention is to provide a step motor of linear type in above-mentioned constitution, wherein stroke of the shaft can be lengthened without limiting the installation position of the front bearing.

DESCRIPTION OF THE PREFERRED EMBODIMENT

An embodiment of the invention will now be described referring to the accompanying drawings.

Figure 1:
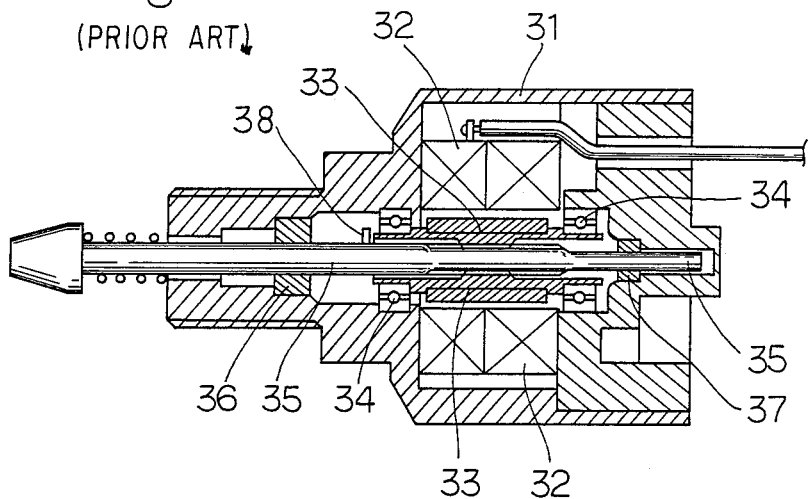
FIG. 1 is a sectional view of a step motor of linear type in the prior art.
Figure 2:
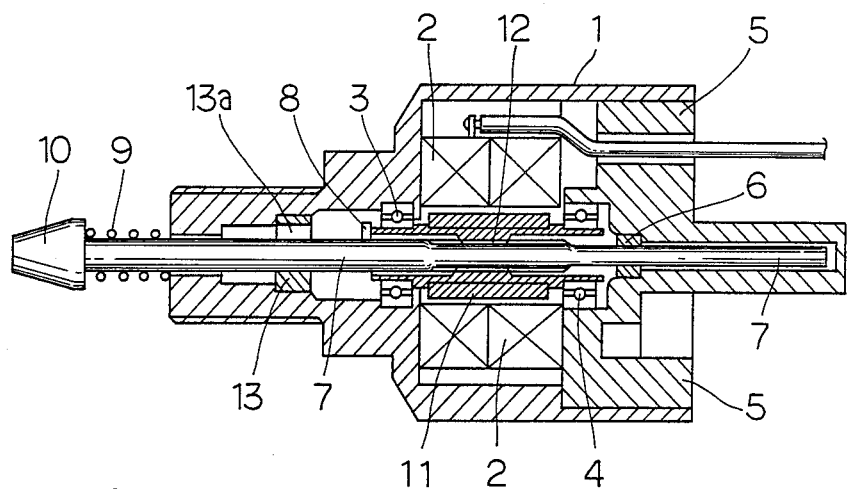
FIG. 2 is a sectional view of a step motor of linear type as an embodiment of the invention.

FIG. 2 shows a sectional view of a step motor of linear type. A stator coil 2 is wound on inner circumferential portion of a motor housing 1 of multi-stepped cylindrical form, and on inside of the stator coil 2 is arranged a ball bearing 3 for rotor with its outer circumferential portion fixed. A rear cover 5 is fitted to rear side of the motor housing 1, and a ball bearing 4 for rotor is fitted on the inside center of the rear cover 5 in coaxial relation to the ball bearing 3. A rear bearing 6 for shaft is fitted to rear inside of the ball bearing 4 so that rear side of a shaft 7 as hereinafter described is supported slidable in the axial direction by the bearing 6.

Figure 3:
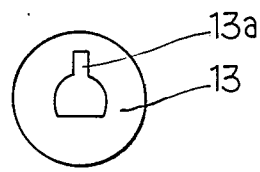
FIG. 3 is a front view of a front bearing in FIG. 2.

A magnet member of a rotor 11 is arranged on inside of the stator coil 2 with a small spacing, and an inner cylinder of the rotor 11 is fixed to an inner race of the ball bearings 3 and 4 thereby the rotor 11 is rotatable on inside of the state coil 2. A female screw 12 is provided on inner circumferential portion of the rotor 11, and is threadedly engaged with a male screw threaded at intermediate portion of the shaft 7. A front bearing 13 for shaft is fitted in the motor housing 1 on front side of the ball bearing 3, and front side of the shaft 7 is slidably supported by the front bearing 13. A stopper pin 8, which abuts on front side of the ball bearing 3 or the rotor 11 and therefore stops, is projected upward to outer circumferential portion of the shaft 7 on front side of the ball bearing 3. A slit 13a which allows the stopper pin 8 to pass is provided on upper side of inner circumferential portion of the front bearing 13. Front portion of the shaft 7 is provided with a flat portion on lower side so as to prevent rotation of the shaft 7, and an inner hole of the front bearing 13 is formed in shape corresponding to the noncircular cross-section of the shaft 7 and the slit 13a is formed on upper side as shown in FIG. 3. Consequently, when the rotor 11 is rotated, the shaft 7 is not rotated but slided in the axial direction. A valve body 10 of a flow rate control valve, for example, is mounted on the front end of the shaft 7 projecting from front portion of the motor housing 1. A coil spring 9 biasing the shaft 7 forward is fitted to rear side of the valve body 10, and since the shaft 7 is normally biased forward the screw member is prevented from chattering due to backlash.

The step motor of linear type in above-mentioned constitution can be used as a drive device of a flow rate control valve, for example. If pulse signals with shifted phases are supplied in sequence to respective magnetic poles of the stator coil 2, the alternating magnetic field varying in sequence in the circumferential direction is generated thereby the rotor 11 is rotated in prescribed direction. When the shaft 7 is moved forward from the state shown in FIG. 2 by the rotation of the rotor 11, the stopper pin 8 for stopping the rear traveling end passes through the slit 13a of the front bearing 13 and is further advanced so that the shaft 7 is advanced until the valve body 10 is entirely closed.

According to the step motor of the invention as above described, since the stopper pin abutting on the stationary portion at the rear traveling end is projected on outer circumferential portion of the shaft and the slit which allows the stopper pin to pass is provided on the front bearing to slidably support the front portion of the shaft, it does not occur that the stopper pin for stopping the rear traveling end abuts on the front bearing during the advancing of the shaft and therefore the advancing is limited. Consequently, the stroke of the shaft can be lengthened without lengthening the front portion of the motor housing.

What is claimed is:

1. A step motor comprising:

(a) a housing having a front end and a rear end;
(b) a stator coil fixed in the housing;
(c) a pair of rotor bearings arranged in the housing;
(d) a rotor rotatably arranged inside of the stator coil supported by said rotor bearings, said rotor being formed with a female screw thread on an inner circumferential surface;
(e) a front shaft bearing arranged on said front end of the housing, said front shaft bearing being provided on its inner circumferential portion with a slot through its entire length allowing a stopper pin to pass through;
(f) a rear shaft bearing arranged on said rear end of the housing;
(g) a shaft formed externally with a male screw thread engaged with the female screw thread on the inner circumferential surface of the rotor, said shaft being positioned in the rotor and movably supported for movement in the axial direction by the front shaft bearing and the rear shaft bearing, the shaft having a flat portion, forming a non-circular sectional portion, formed along the axial direction on a front end portion of the shaft, and the inner hole of the front shaft bearing being formed in a shape corresponding to the non-circular portion of the shaft so as to prevent rotation of said shaft therein; and
(h) a single stopper pin projecting from an outer circumferential portion of the shaft and positioned on the front side of the rotor so as to pass through said slot in said front shaft bearing upon movement of the shaft in the forward direction and to abut on the rotor when the shaft is moved in the rearward direction, such that movement of the shaft in both the forward and rearward directions is not limited by the positions of the front and rear shaft bearings.

2. A step motor comprising:
(a) a housing having a front end and a rear end;
(b) a rear cover fitting to said rear end of the housing;
(c) a stator coil fixed in the housing;
(d) a bearing for a rotor arranged in the front end of the housing and another bearing for the rotor arranged in the rear cover, both rotor bearings being arranged in coaxial relation;
(e) a rotor arranged to rotate inside the stator coil on said rotor bearings, said rotor being formed with a female screw thread on an inner circumferential surface;
(f) a front shaft bearing mounted on said front end of the housing, said front shaft bearing being provided on an inner circumferential portion with a slot through its entire length allowing a stopper pin to pass through;
(g) a rear shaft bearing mounted on the rear cover;
(h) a shaft formed externally with a male screw thread engaged with the female screw thread on the inner circumferential surface of the rotor, said shaft being positioned in the rotor and movably supported for movement in the axial direction by the front shaft bearing and the rear shaft bearing, the shaft having a flat portion, forming a non-circular sectional portion, formed along the axial direction on a front end portion of the shaft, and the inner whole of the front shaft bearing being formed in a shape corresponding to the non-circular portion of the shaft so as to prevent rotation of said shaft therein; and
(i) a single stopper pin projecting from an outer circumferential portion of the shaft, on the front side of the rotor, so as to pass through said slot in said front shaft bearing upon movement of the shaft in the forward direction and to abut on the rotor when the shaft is moved in the rearward direction, such that movement of the shaft in both the forward and rearward directions is not limited by the positions of the front and rear shaft bearings.

* * * * *